No. 764,532. PATENTED JULY 5, 1904.
G. LOGAN.
STENOGRAPHER'S SCALE.
APPLICATION FILED JUNE 9, 1903.
NO MODEL.
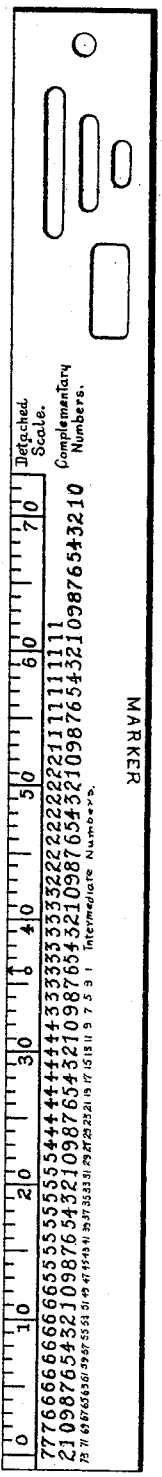
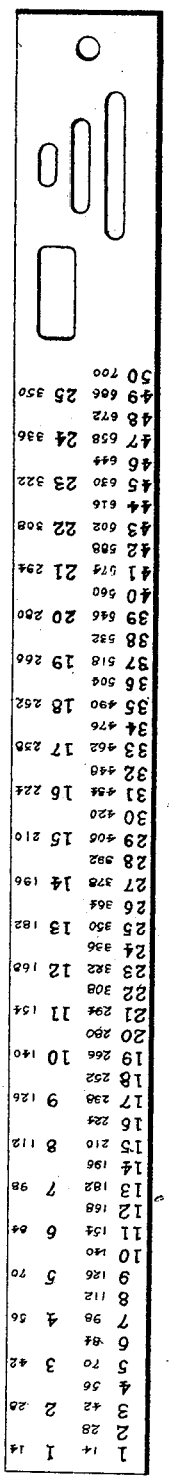
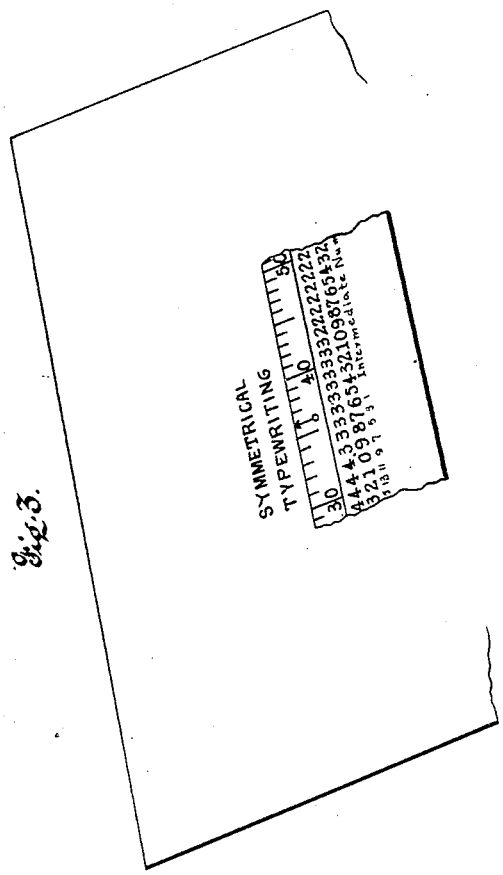
Witnesses
Inventor
George Logan
by Higdon & Longan & Hopkins Attys No. 764,532.

Patented July 5, 1904.

UNITED STATES PATENT OFFICE.

GEORGE LOGAN, OF ST. LOUIS, MISSOURI.

STENOGRAPHER'S SCALE.

SPECIFICATION forming part of Letters Patent No. 764,532, dated July 5, 1904.

Application filed June 9, 1903. Serial No. 160,764. (No model.)

*To all whom it may concern:*

Be it known that I, GEORGE LOGAN, a citizen of the United States, residing at St. Louis, State of Missouri, have invented certain new and useful Improvements in Stenographers' Scales, of which the following is a specification containing a full, clear, and exact description, reference being had to the accompanying drawings, forming a part hereof.

My invention relates to an improved stenographer's scale, and has for its object to provide a scale to be used in computing the number of words upon a type-written page, to be used in placing and spacing words and letters symmetrically upon the type-written page, and the scale is also to be used as an erasing-guide and as a marker.

In the drawings, which form a part of this specification, Figure 1 is a top view of a scale embodying my invention. Fig. 2 is a bottom view of the same. Fig. 3 is a view of a sheet of paper, illustrating the manner in which my scale is used in symmetrical type-writing.

As illustrated in Fig. 1, my scale is adapted for use upon work which is being performed upon a type-writer having the usual seventy-two-point scale. It will be noticed that at the thirty-sixth point from the left side of the scale I have placed an arrow indicating the middle of the scale. The scale thus shown in Fig. 1 is to be applied to the word or phrase which is purposed to be type-written, with the arrow pointing to the middle of the word or phrase, as shown in Fig. 3. The operator is thus shown at a glance at what points the first letter and last letter of the word or phrase will fall when the word or phrase is evenly balanced across the type-written page.

As shown in Fig. 1, I have placed below the second row of complementary numbers a row designated as "intermediate" numbers, beginning beneath the arrow and running backward to the first point upon the scale. This series of numbers is intended for use where the copy used by the stenographer is in any other form than type-written. In the use of such copy it will be necessary for the stenographer to count the total number of points in the matter purposed to be written, including spaces. The total number of units thus ascertained will be found upon the row of intermediate numbers, and the point on the scale above the number so found will indicate the point at which the first type-written letter is to be imprinted. Thus if the total length of the matter to be balanced upon the type-written page amounts to forty-seven letters and spaces the stenographer refers to the number "47" in the row of intermediate numbers and finds that the point on the scale immediately above the number "47" is "13." The first letter is accordingly imprinted at the thirteenth point upon the scale, and the complementary numbers read downward from the thirteenth point upon the scale give the number "59." Consequently the matter will be evenly balanced upon the page, the first letter being at the thirteenth point upon the scale and the last being at the fifty-ninth.

The reverse side of the scale shown in Fig. 2 affords a ready means of quickly estimating the approximate number of words in a given number of lines of type-written matter, either single spaced or double spaced. As shown in Fig. 2, the scale is numbered from "1" to "50" upon the left-hand side of the scale, these numbers representing a corresponding number of single-spaced lines, these line-numbers being indicated by the heavy numbers nearest the edge of the scale. In the next adjacent column are the figures "14," "28," "42," &c., being the total number of words, on an average of fourteen words to a line, which are to be found in the number of lines ascertained by placing the scale vertically upon the type-written page with the figure "1" in alinement with the first type-written line upon the page. Thus in thirty-one type-written lines single spaced the number of words will be approximately four hundred and thirty-four. The third column of figures indicates a number of lines double spaced and is numbered from "1" to "25." The fourth column represents the total number of words to be found in any desired number of these lines estimated upon a basis of fourteen words to a line. Thus in thirteen lines double spaced there will be found one hundred and eighty-two words.

It is manifest that my scale can be made with the numbering and marking shown in Fig. 1 or the numbering shown in Fig. 2 separately; but I prefer to have them appear, respectively, upon the opposite sides of a thin strip of metal or celluloid or the like in order that the scale may be used for both purposes, may be used as a marker along its edge, which is indicated by the word "marker" in Fig. 1, and that it may contain the various openings indicated at the end of each figure for the purpose of making erasures.

Upon the face of the scale shown in Fig. 1, beneath the detached scale which is shown at the upper edge of the scale, I have placed in a second row the series of complementary numbers shown. The object of this series of complementary numbers is as follows: When the arrow is placed exactly at the middle letter of a word or phrase, the figures in the rows of complementary numbers immediately below the first letter of the word or phrase read from top to bottom will show where the last letter of the word or phrase will fall. Thus, as illustrated in Fig. 3, the arrow points to the letter "r" in the word "type-writing." The initial letter of that word is then above the thirty-first point upon the scale. In the rows of complementary numbers, read downwardly from the thirty-first point, are to be found the numerals "4" and "1" or "41," thus indicating that the last letter of the word will occur at the forty-first point upon the scale, which is demonstrated to be the fact by the illustration. If, for another illustration, the arrow points to the middle letter of a word or phrase when the initial letter of the word or phrase is above the twenty-third point upon the scale, reading the complementary numbers beneath the initial letter downwardly, we find the numerals "4" and "9" or "49," and thus have indicated that the last letter of the word or phrase will occur at the forty-ninth point upon the scale.

It is obvious that by means of my invention much time and labor of computation may be saved to the stenographer.

As shown in Fig. 1, the first column of figures along the edge of the scale is in alinement with the points on the type-writer scale. On the reverse side of the scale the figures in the first column or row, as shown in Fig. 2, are in alinement with the lines of a single-spaced type-written page. By reason of this alinement of the figures of the first column with the letters and lines of the work performed by the type-writing machine the scale is adapted to be imposed upon the paper, its figures corresponding horizontally to the letters and vertically to the number of lines, so that the respective sides of the scale may be read at a glance to secure, first, the symmetrical balancing of matter upon the line, or, second, the approximate number of words in the type-written lines.

Having fully described my invention, what I claim as new, and desire to have secured to me by the grant of Letters Patent, is—

1. A stenographer's rule, comprising a scale spaced to correspond to the scale of the typewriter and containing an arrow at the central point upon the scale, a series of complementary numbers arranged in two rows beneath the scale, the complementary numbers being so arranged that when the arrow points to the central word or figure of copy intended to be reproduced upon the type-written page, the complementary numbers beneath the point upon the scale immediately below the first word or figure when read downwardly will indicate the point upon the scale at which the last word or figure will occur when the matter is type-written, substantially as described.

2. A stenographer's rule, comprising a scale spaced to correspond to the scale of the typewriter and containing an arrow at the central point upon the scale, a series of complementary numbers arranged in two rows beneath the scale, the complementary numbers being so arranged that when the arrow points to the central word or figure of copy intended to be reproduced upon the type-written page, the complementary numbers beneath the point upon the scale immediately below the first word or figure when read downwardly will indicate the point upon the scale at which the last word or figure will occur when the matter is type-written, and a row of intermediate numbers placed beneath the lower row of complementary numbers from the first point upon the scale to the point indicated by the arrow, substantially as described.

In testimony whereof I have signed my name to this specification in presence of two subscribing witnesses.

GEORGE LOGAN.

Witnesses:
 ALFRED A. EICKS,
 M. G. IRION.